US012742610B2

(12) United States Patent
Shamblen et al.

(10) Patent No.: US 12,742,610 B2
(45) Date of Patent: Sep. 22, 2026

(54) BEARINGS FOR ARCHERY BOWS AND RELATED APPARATUSES

(71) Applicant: Hoyt Archery, Inc., Salt Lake City, UT (US)

(72) Inventors: Kevin T. Shamblen, West Jordan, UT (US); Gideon S. Jolley, Syracuse, UT (US)

(73) Assignee: Hoyt Archery, Inc., Salt Lake City, UT (US)

( * ) Notice: Subject to any disclaimer, the term of this patent is extended or adjusted under 35 U.S.C. 154(b) by 190 days.

(21) Appl. No.: 18/405,227

(22) Filed: Jan. 5, 2024

(65) Prior Publication Data

US 2025/0224193 A1 Jul. 10, 2025

(51) Int. Cl.
*F41B 5/10* (2006.01)
*F16C 19/18* (2006.01)

(52) U.S. Cl.
CPC .............. *F41B 5/105* (2013.01); *F16C 19/18* (2013.01)

(58) Field of Classification Search
CPC .......... F41B 5/105; F41B 5/14; F41B 5/1403; F41B 5/10; F16C 19/00; F16C 19/18; F16C 19/181; F16C 25/06; Y10S 124/90
USPC .......... 124/25.6, 86, 900; 384/490, 513, 504
See application file for complete search history.

(56) References Cited

U.S. PATENT DOCUMENTS 3,034,839 A * 5/1962 Schoos ................... F16C 43/04 384/492
3,619,017 A * 11/1971 Robinson ................ F16C 27/04 384/535
3,986,754 A * 10/1976 Torrant ................... F16C 19/54 29/898.063
4,073,551 A * 2/1978 Sutowski ................ F16C 19/18 384/510
4,925,322 A * 5/1990 Hishida ................. F16C 19/183 384/510
5,193,916 A * 3/1993 Andersson ............ F16C 33/588 384/515
5,775,819 A * 7/1998 Kinney ................. F16C 33/588 384/449
6,415,780 B1 * 7/2002 Proctor ..................... F41B 5/10 124/900
6,871,643 B2 * 3/2005 Cooper ..................... F41B 5/10 124/900
6,964,271 B2 * 11/2005 Andrews ................... F41B 5/10 267/153
7,938,109 B1 * 5/2011 Larson ...................... F41B 5/10 124/25.6
7,971,582 B1 * 7/2011 Larson ...................... F41B 5/10 124/900
8,020,544 B2 * 9/2011 McPherson ............... F41B 5/10 124/23.1
8,069,848 B1 * 12/2011 Larson ...................... F41B 5/10 124/900

(Continued)

*Primary Examiner* — Alexander R Niconovich

(57) ABSTRACT

A bearing for an archery bow having an inner race and an outer race. The inner and outer races can define two or more raceways at least partially retaining respective sets of balls. In some examples, the bearing can be disposed within a cam or eccentric of the archery bow. In some examples, two or more bearings can be disposed within the cam. Each respective inner race of the two or more bearings can contact one another to form a continuous load path in some examples.

15 Claims, 15 Drawing Sheets

(56) References Cited

U.S. PATENT DOCUMENTS

| | | | | |
|---|---|---|---|---|
| 8,671,925 | B2 * | 3/2014 | Grace | F41B 5/10 124/900 |
| 9,528,788 | B2 * | 12/2016 | McPherson | F41B 5/14 |
| 9,599,151 | B2 * | 3/2017 | Habibvand | F16C 19/184 |
| 10,126,087 | B1 * | 11/2018 | Grace | F41B 5/123 |
| 11,486,674 | B2 * | 11/2022 | McPherson | F41B 5/1403 |
| 11,536,532 | B1 * | 12/2022 | Grace | F41B 5/1403 |
| 11,821,708 | B1 * | 11/2023 | Hansen | F41B 5/1403 |
| 12,130,112 | B1 * | 10/2024 | Hayes | F41B 5/1403 |
| 12,163,757 | B2 * | 12/2024 | Grace | F41B 5/10 |
| 2014/0199171 | A1 * | 7/2014 | Jepsen | F16C 19/08 416/174 |
| 2016/0076590 | A1 * | 3/2016 | Moratz | F16C 19/163 384/514 |
| 2016/0252134 | A1 * | 9/2016 | Koda | F01D 25/16 384/462 |
| 2020/0248746 | A1 * | 8/2020 | Habibvand | F16C 19/183 |
| 2025/0290724 | A1 * | 9/2025 | Shamblen | F41B 5/105 |

* cited by examiner

BEARINGS FOR ARCHERY BOWS AND RELATED APPARATUSES

TECHNICAL FIELD

The present disclosure generally relates to archery equipment and specifically relates to bearing systems for rotating eccentrics or wheels on archery equipment.

BACKGROUND

Archery equipment, such as recurve bows, crossbows, and compound bows, are regularly used to launch arrows and other projectiles down range at one or more targets. Components of the archery bow work in unison to provide accurate and repeatable arrow flight while also providing a desirable user experience (e.g., satisfactory vibration and sound characteristics). As such, the components of an archery bow need to repeatably and reliably function each and every time an archer draws the bow string and launches an arrow. Components for archery bows can be improved to advantageously impact an archer's shooting experience, performance, and overall satisfaction with the archery equipment.

SUMMARY

One aspect of the present disclosure relates to a cam assembly for an archery bow. The cam assembly including a cam, an axle, and a bearing. The bearing is rotatable about the axle. The bearing includes an inner race and an outer race. The inner race and the outer race define or form a first raceway and a second raceway. A first set of balls are disposed within the first raceway and between the inner race and the outer race. A second set of balls are disposed within the second raceway and between the inner race and the outer race.

In some examples, the outer race has a first width and the inner race has a second width. The second width can be greater than the first width. In some examples, the bearing can be a first bearing, the inner race can be a first inner race, and the outer race can be a first outer race. The cam assembly can further include a second bearing rotatable about the axle. The second bearing can include a second inner race and a second outer race. The second inner race and the second outer race can define or form a third raceway and a fourth raceway. A third set of balls are disposed within the third raceway and between the second inner race and the second outer race. A fourth set of balls are disposed within the fourth raceway and between the second inner race and the second outer race. In some examples, the first inner race can include a first rim contacting a second rim of the second inner race.

In some examples, the cam can define a bore spanning a width of the cam and the bearing can occupy the entirety of the width. In some examples, the first set of balls can engage the first raceway to provide a first thrust resistance. The second set of balls can engage the second raceway to provide a second thrust resistance. The bearing can have a total thrust resistance greater than the first thrust resistance or the second thrust resistance. In some examples, the first set of balls can engage the first raceway to provide a first radial load threshold. The second set of balls can engage the second raceway to provide a second radial load threshold. The bearing can have a total radial load threshold greater than the first radial load threshold or the second radial load threshold.

In some examples, the first inner race and the second inner race contact one another to form a continuous load path. In some examples, a first spacer can be disposed on the axle adjacent the first inner race. A second spacer can be disposed on the axle adjacent the second inner race. The first spacer, the second spacer, the first inner race, and the second inner race can form or define a continuous load path.

Another aspect of the present disclosure relates to a cam assembly for an archery bow including a cam, an axle, and a set of bearings. The cam defines a bore. The axle is at least partially disposed within the bore. The set of bearings are at least partially disposed within the bore and rotatable about the axle. The set of bearings include a first bearing, a second bearing, and a third bearing. The first bearing includes a first raceway and a first set of balls disposed within the first raceway. The first bearing includes a first inner race at least partially defining the first raceway. The second bearing includes a second raceway and a second set of balls disposed within the second raceway. The second bearing includes a second inner race at least partially defining the second raceway. The third bearing includes a third raceway and a third set of balls disposed within the third raceway. The third bearing includes a third inner race at least partially defining the third raceway. The first inner race, the second inner race, and the third inner race define or form a continuous load path.

In some examples, the cam assembly can also include a first spacer and a second spacer. The first spacer can be disposed on the axle and adjacent the first inner race. The second spacer can be disposed on the axle and adjacent the third inner race. The first spacer, the second spacer, the first inner race, the second inner race, and the third inner race can define or form the continuous load path. In some examples, the first inner race has a first width and the second inner race has a second width. The third inner race can have a third width and the bore can have a bore width. The bore width can be less than a summation of the first width, the second width, and the third width.

In some examples, the first bearing includes a first outer race. The first outer race can have a first width. The first inner race can have a second width. The second width can be greater than the first width. In some examples, the second bearing can include a second outer race. The second outer race can have a third width. The second inner race can have a fourth width. The fourth width can be greater than the third width.

In some examples, the set of bearings can include a fourth bearing having a fourth raceway and a fourth set of balls disposed within the fourth raceway. The fourth bearing can include a fourth inner race at least partially defining the fourth raceway. In some examples, the first inner race, the second inner race, the third inner race, and the fourth inner race can form or define the continuous load path.

Yet another aspect of the present disclosure includes a bearing for an archery bow. The bearing includes an inner race, an outer race, a first set of balls, and a second set of balls. The inner race and the outer race define a first raceway and a second raceway. The first set of balls are disposed within the first raceway and between the inner race and the outer race. The second set of balls are disposed within the second raceway and between the inner race and the outer race.

In some examples, the outer race has a first width. The inner race has a second width greater than the first width. In some examples, the bearing is configured to be disposed within a cam or a roller wheel of an archery bow.

The above summary of the present invention is not intended to describe each embodiment or every implementation of the present invention. The Figures and the detailed description that follow more particularly exemplify one or more preferred embodiments.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1A:
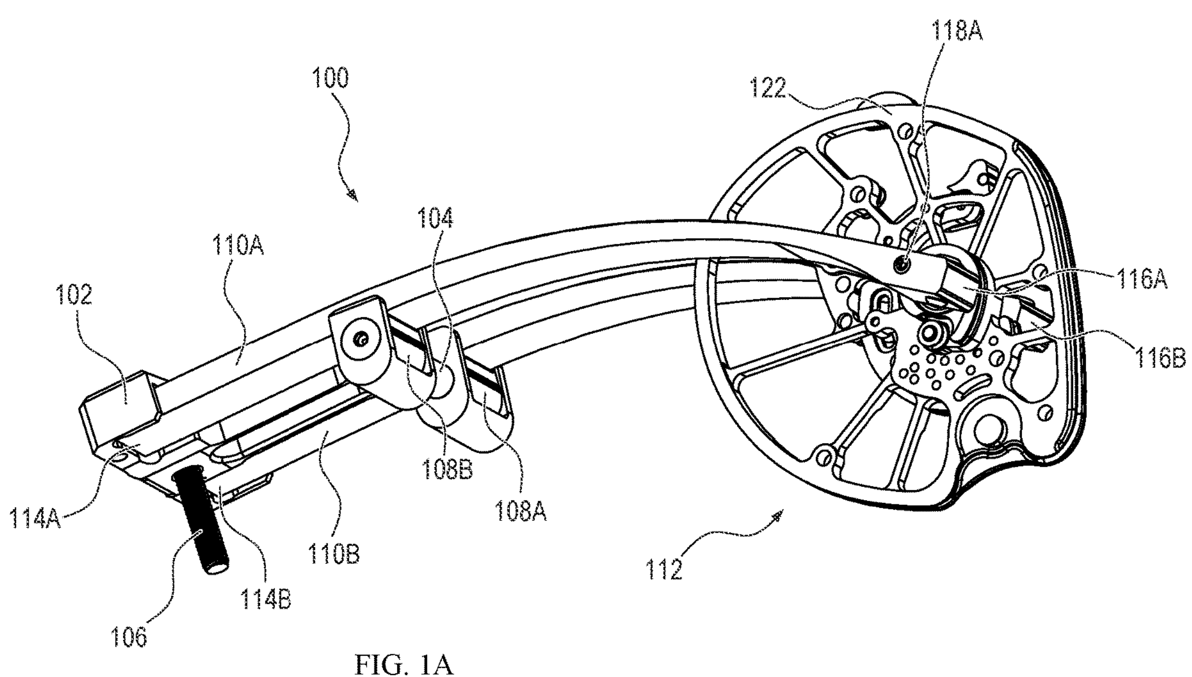
FIG. 1A is a perspective side view of a subset of components of an archery bow, according to some embodiments.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Archery bows can include one or more limbs which are deflected to generate energy sufficient to launch a projectile, such as an arrow. The one or more limbs can be continuously held in a deflected or bent state until the archer is ready to release the bow string and launch the arrow affixed thereto. In some examples, mechanical advantage can be utilized within an archery bow such that the holding weight experienced by the archer while the bow is in a fully drawn condition is reduced or decreased. For example, compound archery bows can include one or more eccentrics or cam assemblies to vary a draw weight of the archery bow through the draw cycle.

In some examples, these cam assemblies include one or more wheels or cams rotatably coupled about an axle affixed to the one or more limbs. For example, an axle can be retained by a set of limbs (or limb hangers affixed to the set of limbs) and the cam can be rotatable about the axle via one or more ball-bearings pressed or otherwise coupled to the cam. While affixed to an archery bow, each cam assembly can be placed under one or more loads. For example, deflection of the one or more limbs can generate tension on the bowstring and/or cable(s) which can induce one or more forces or loads on the cam assemblies. These forces or loads can be applied to one or more of the ball bearings within the cam assembly, such as, a radial load, an axial load, a moment load, a combination thereof, or any other forces or loads applied to the ball bearing.

In one aspect of the present disclosure, a cam assembly can include a cam or eccentric, an axle, and one or more bearings rotatable about the axle. Each of the one or more ball bearings can include an inner race and an outer race. The inner and outer races can form or define a first raceway and a second raceway. Each of the one or more bearings can further include a first set of balls disposed within the first raceway and a second set of balls disposed within the second raceway. In other words, each of the one or more bearings can include two or more raceways or grooves retaining respective sets of balls between the same inner race and outer race (e.g., first outer race 208A and first inner race 210A). The two or more discrete raceways and sets of balls within each respective bearing can increase an axial load threshold, a radial load threshold, a moment load threshold, and/or a combination thereof of the one or more bearings by distributing the loads applied to the bearing across the two or more discrete sets of balls disposed within the respective raceways.

In another aspect of the present disclosure, a cam assembly can include a cam or eccentric, an axle, and a set of bearings rotatable about the axle. Each bearing within the set of bearings can include a respective inner race. Each of the inner races can abut one another such that the inner races form a continuous load path. For example, abutting the respective inner races to one another can create or form a continuous load path such that an axial load or a thrust load exerted on the respective inner races does not substantially move or translate the respective inner races relative to respective outer races of the bearings. Additionally, or alternatively, abutting the respective inner races can create or form a continuous load path to substantially reduce or mitigate any moments induced on the respective inner races.

The present description provides examples, and is not limiting of the scope, applicability, or configuration set forth in the claims. Thus, it will be understood that changes may be made in the function and arrangement of the bearings and/or other elements of the cam assembly discussed without departing from the spirit and scope of the disclosure, and various embodiments may omit, substitute, or add other procedures or components as appropriate. For instance, features described with respect to certain embodiments may be combined in other embodiments. The specific examples shown in the figures and described herein should not, therefore, be considered to limit the breadth of possible embodiments and combinations of possible embodiments contemplated by the present disclosure.

Figure 1B:
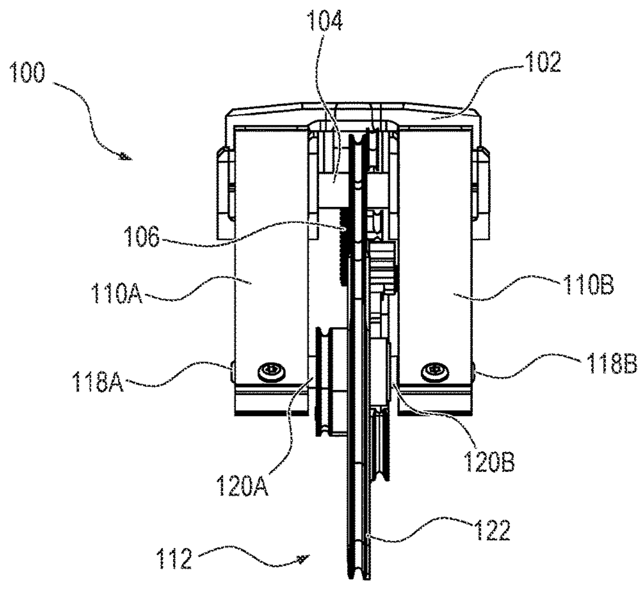
FIG. 1B is a rear view of the subset of components, according to some embodiments.

Referring now to the figures in detail, FIGS. 1A and 1B show subcomponents 100 of a compound archery bow including a limb pocket 102, a pocket dowel 104, a limb bolt 106, a set of rockers 108A, 108B, a set of limbs 110A, 110B, and a cam assembly 112. In some examples, the pocket dowel 104 and the limb bolt 106 can couple or otherwise affix the limb pocket 102 to an upper portion of a riser or handle (not shown) of an archery bow. Similarly, the archery bow can include a second set of subcomponents (not shown) affixable to a lower portion of the riser or handle (not shown) of the archery bow. Proximal ends 114A, 114B of the set of limbs 110A, 110B can be disposed within the limb pocket 102. The set of rockers 108A, 108B can support intermediate portions of each limb on the pocket dowel 104. The cam assembly 112 can be affixed or coupled to distal ends 116A, 116B of the set of limbs 110A, 110B, for example, by an axle (see e.g., axle 204 in FIG. 2B) at least partially disposed within the distal ends 116A, 116B of the set of limbs 110A, 110B or coupled to a limb hanger (not shown).

In some examples, the axle can be affixed to the set of limbs 110A, 110B by one or more fasteners 118A, 118B and a cam 122 of the cam assembly 112 can be located between the set of limbs 110A, 110B by one or more cam spacers 120A, 120B disposed on the axle. In some examples, the cam assembly 112 can include the cam 122, the axle (see e.g., axle 204 in FIG. 2B), and one or more bearings (see e.g., first and second bearing(s) 206A, 206B in FIG. 2B or bearing 306 in FIG. 3B).

Figure 2A:
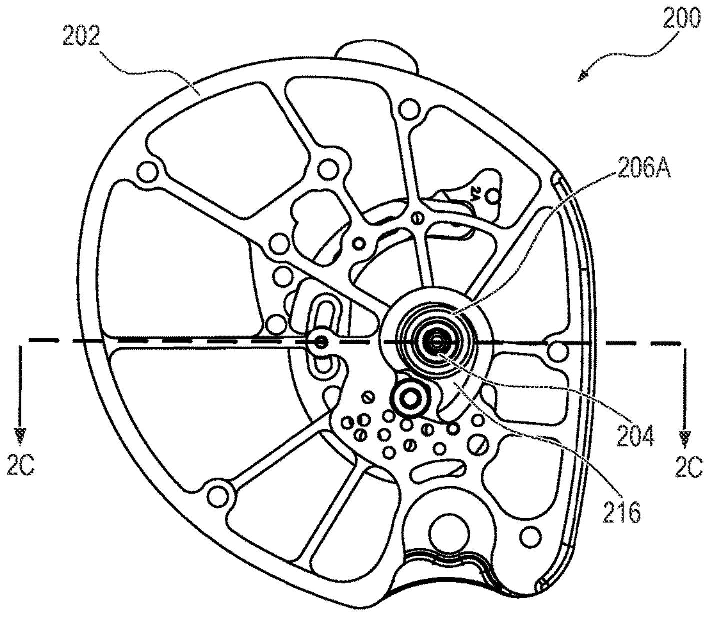
FIG. 2A is a side view of a cam assembly of an archery bow, according to some embodiments.
Figure 2B:
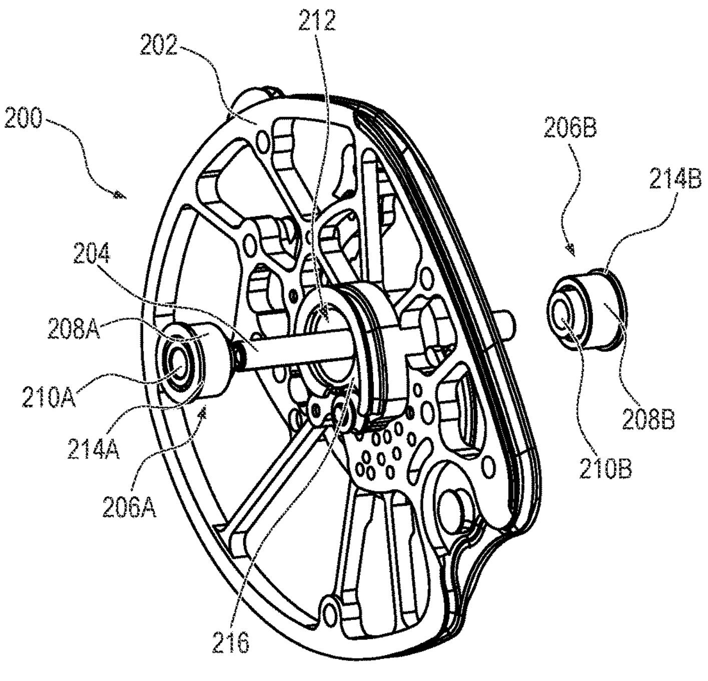
FIG. 2B is a partially exploded perspective side view of the cam assembly, according to some embodiments.

FIG. 2A shows a cam assembly 200 according to one embodiment. FIG. 2B shows a partially exploded view of the cam assembly 200. The cam assembly 200 can include a cam 202, an axle 204, a first bearing 206A, and a second bearing 206B. In some examples, the cam assembly 200 can further include one or more additional bearings, fasteners, modules, polymeric dampers, cable splitters, a combination thereof, or any other component associated with an archery bow eccentric.

In some examples, the first bearing 206A can include a first outer race 208A and a first inner race 210A. The first outer race 208A can be press-fit, fastened, adhered, or otherwise coupled within a bore 212 or cavity formed within the cam 202. Similarly, the second bearing 206B can include a second outer race 208B and a second inner race 210B. The second outer race 208B can be press-fit, fastened, adhered, or otherwise coupled within the bore 212 formed within the cam 202. The axle 204 can be disposed within the first and second inner races 210A, 210B of the first and second bearings 206A, 206B, respectively.

In some examples, the first outer race 208A and/or the second outer race 208B can include a flanged portion (see e.g., first and second flanged portions 214A, 214B). The first and second flanged portions 214A, 214B can contact a lateral surface of the cam 202 (e.g., lateral surface 216) when the first and second bearings 206A, 206B are at least partially disposed within the bore 212. In some examples, the first flanged portion 214A can be integrally formed with the first outer race 208A. In some examples, the first flanged portion 214A can be a discrete component of the first bearing 206A and can be coupled or otherwise affixed to the first outer race 208A. In some examples, the second flanged portion 214B can be integrally formed with the second outer race 208B. In some examples, the second flanged portion 214B can be a discrete component of the second bearing 206B and can be coupled or otherwise affixed to the second outer race 208B. In some examples, one or both of the first and second outer races 208A, 208B may not include a flanged portion.

Figure 2C:
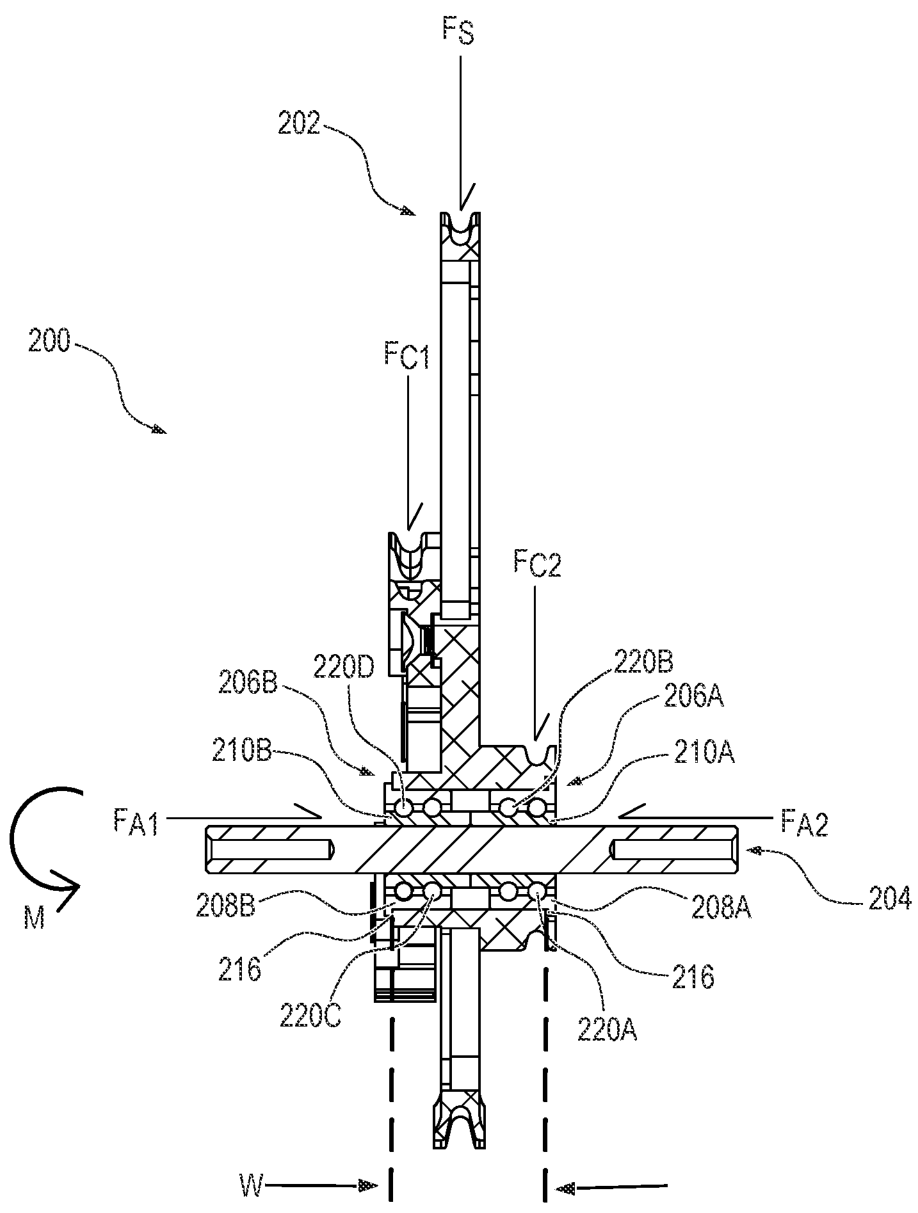
FIG. 2C is cross-sectional rear view of the cam assembly, according to some embodiments.
Figure 2D:
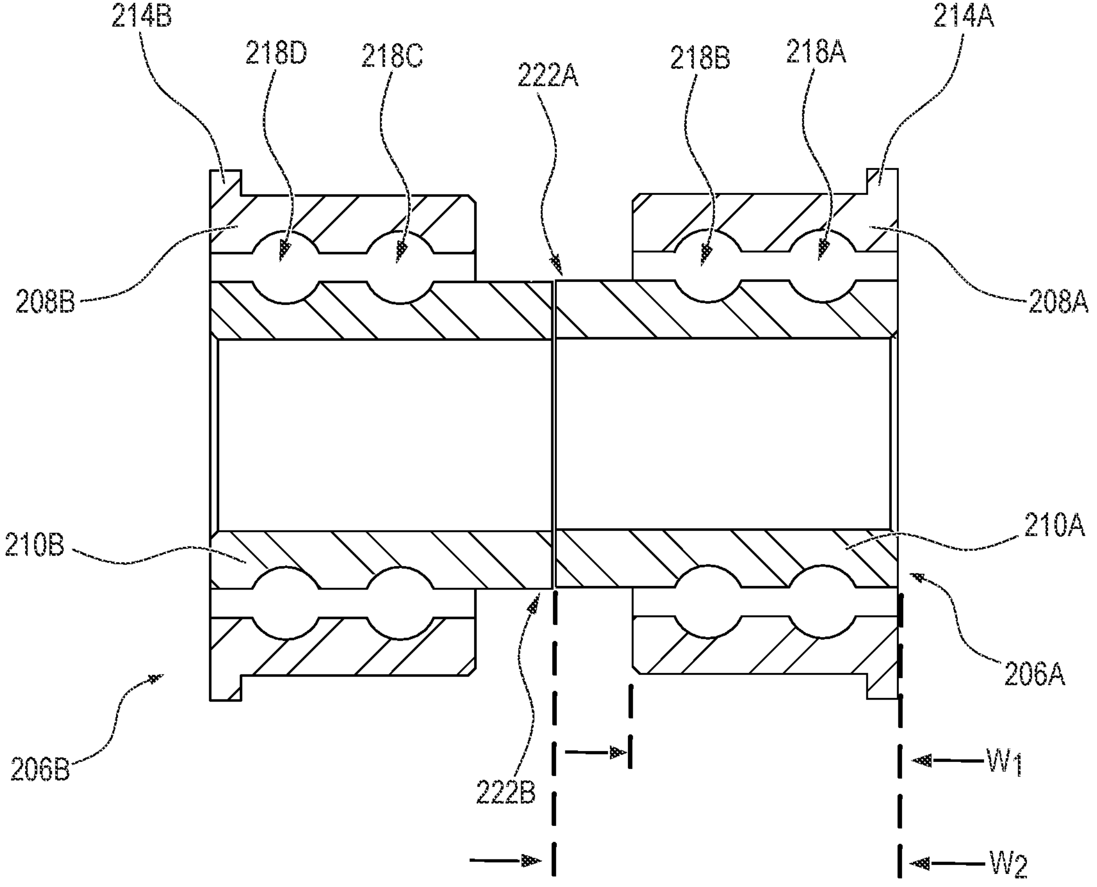
FIG. 2D is a cross-sectional rear view of a set of bearings, according to some embodiments.

FIG. 2C shows a cross-sectional view of the cam assembly 200 through the section line 2C-2C shown in FIG. 2A. FIG. 2D shows a cross-sectional view of the set of bearings (i.e., the first and second bearings 206A, 206B) through the section line 2C-2C shown in FIG. 2A. Various forces can induce one or more loads (e.g., axial, radial, or a combination thereof) on the set of bearings during operation of the archery bow. For example, a bowstring can be held in tension such that a force $F_S$ is applied to the cam 202 and the first and second bearings 206A, 206B. Similarly, one or more cables can be held in tension such that forces $F_{C1}$, $F_{C2}$ are applied to the cam 202 and the first and second bearings 206A, 206B. In some examples, one or more fasteners (e.g., fasteners 118A, 118B) can apply axial forces $F_{A1}$, $F_{A2}$ (through limb and spacer components) to the first and second bearings 206A, 206B. One or more of these forces $F_S$, $F_{C1}$, $F_{C2}$, $F_{A1}$, and $F_{A2}$ can generate a moment M on the cam 202, the axle 204, the first bearing 206A, the second bearing 206B, or a combination thereof. The forces $F_S$, $F_{C1}$, $F_{C2}$, $F_{A1}$, $F_{A2}$ and/or the moment M induce an axial load and/or a radial load on the first and second bearings 206A, 206B.

In some examples, one or both of the first and second bearings 206A, 206B can include two or more discrete sets of balls (e.g., stainless steel balls) disposed within two or more discrete raceways defined or formed by the first and second outer races 208A, 208B and the first and second inner races 210A, 210B. For example, the first outer race 208A and the first inner race 210A can form or define a first raceway 218A and a second raceway 218B. In some examples, each of the first raceway 218A and the second raceway 218B can be formed or defined as channels or grooves within surfaces of the first outer race 208A and first inner race 210A that face one another. For example, the channels or grooves can be machined, molded, or otherwise incorporated into the first outer race 208A and the first inner race 210A. Each of the first and second raceways 218A, 218B can locate and retain first and second sets of balls 220A, 220B (see FIG. 2C) within the first bearing 206A. The first and second raceways 218A, 218B are shown in FIG. 2D with the respective sets of balls 220A, 220B removed. In some examples, a diameter of the first set of balls 220A can be different from a diameter of the second set of balls 220B.

In some examples, the second outer race 208B and the second inner race 210B can form or define a third raceway 218C and a fourth raceway 218D. In some examples, each of the third raceway 218C and the fourth raceway 218D can be formed or defined as channels or grooves within surfaces of the second outer race 208B and second inner race 210B that face one another. For example, the channels or grooves can be machined, molded, or otherwise incorporated into the second outer race 208B and the second inner race 210B. Each of the third and fourth raceways 218C, 218D can locate and retain third and fourth sets of balls 220C, 220D (see FIG. 2C) within the second bearing 206B. The third and fourth raceways 218C, 218D are shown in FIG. 2D with the respective sets of balls 220C, 220D removed. In some examples, a diameter of the third set of balls 220A can be different from a diameter of the fourth set of balls 220B.

The two or more discrete raceways and sets of balls can increase an axial load threshold, a radial load threshold, a moment load threshold, or a combination thereof of the first bearing 206A and/or the second bearing 206B, respectively, by distributing the loads applied to the first bearing 206A or the second bearing 206B across two or more discrete sets of balls 220A-220D disposed within the respective raceways 218A-218D. The two or more discrete raceways and sets of balls can also reduce friction between races (i.e., respective inner and outer races) and the respective sets of balls disposed within the respective raceways.

In some examples, the first bearing 206A can include more than the first and second raceways 218A, 218B. For example, the first bearing 206A can include more than two raceways, such as, three or more raceways formed or defined by the first outer race 208A and the first inner race 210A. Each of the three or more raceways can at least partially retain or house respective sets of balls within each raceway. Additionally, or alternatively, the second bearing 206B can include more than the third and fourth raceways 218C, 218D. For example, the second bearing 206B can include more than two raceways, such as, three or more raceways formed or defined by the second outer race 208B and the second inner race 210B. Each of the three or more raceways can at least partially retain or house respective sets of balls within each raceway.

In some examples, the first bearing 206A can include a first rim 222A abutting or contacting a second rim 222B of the second bearing 206B. In some examples, the first rim 222A can be an outermost surface or lateral surface of the first inner race 210A. In some examples, the first rim 222A can be an outermost surface or lateral surface of the first outer race 208A. In some examples, the second rim 222B can be an outermost surface or lateral surface of the second inner race 210B. In some examples, the second rim 222B can be an outermost surface or lateral surface of the second outer race 208B. In some examples, the first and second bearings 206A, 206B envelop or encase the portion of the axle 204 disposed within the bore 212 of the cam 202. In other words, the first and second bearings 206A, 206B can surround or bound a portion of the axle 204 extending a width W of the bore 212 of the cam 202. Abutting the first rim 222A to the second rim 222B can create or form a continuous load path such that an axial load or a thrust load exerted on the first and second inner races 210A, 210B does not substantially move or translate the first and second inner races 210A, 210B relative to the first and second outer races 208A, 208B.

The term continuous load path can refer to a transfer of load between components of the cam assembly 200 (e.g., the limbs, cam spacers, and set of bearings) which are in contact with one another. As such, the one or more components do not substantively translate along the axle 204 when a load is applied to any one of the components. In other words, there are no gaps or exposed portions of the axle 204 between the components disposed on the axle 204. Thus, a load exerted on a first component (e.g., the first bearing 206A) of the cam assembly 200 is transferred to an adjacent component (e.g., the second bearing 206B) without substantially translating or moving the first component along the axle 204. For example, abutting the first rim 222A to the second rim 222B can create or form a continuous load path to substantially reduce or mitigate any moments induced on the first and second inner races 210A, 210B. In some examples, the continuous load path can mitigate or limit movement between the first and second inner races 210A, 210B relative to the first and second outer races 208A, 208B. In other words, the continuous load path can retain the inner and outer races in an orientation such that the first and/or second bearings 206A, 206B remain below a maximum axial load rating or a maximum thrust threshold of the respective bearing. While the continuous load path may not prevent or eliminate all movement between the first and second inner races 210A, 210B and the first and second outer races 208A, 208B, the continuous load path can prevent loading the first and/or second bearings beyond the maximum axial load rating or the maximum thrust threshold of the respective bearing.

In some examples, the tolerances of one or more components within the cam assembly 200 (e.g., cam 202, first bearing 206A, second bearing 206B, etc.) can cause a very small minority of the axle 204 located within the bore 212 to be exposed (e.g., unenveloped or not surrounded by the first and second inner races 210A, 210B) while the archery bow is at rest, drawn, and/or launching a projectile. For example, the first rim 222A and the second rim 222B can be out of contact or come out of contact with one another while the archery bow is at rest, drawn, or launching a projectile and thereby create a very small minority of the axle 204 that is not surrounded by the first and second inner races 210A, 210B. This very small minority exposed or unenveloped portion of the axle 204, however, can be 5% or less of a length of the portion of the axle 204 enveloped or surrounded by the first and second inner races 210A, 210B.

In some examples, the cam assembly 200 and one or more other components of the archery bow can generate or form a continuous load path. For example, the limbs (e.g., set of limbs 110A, 110B), the cam spacers (e.g., the one or more cam spacers 120A, 120B), the first and second inner races 210A, 210B can be placed in compression on the axle 204 by one or more fasteners (e.g., the one or more fasteners 118A, 118B) to create or form a continuous load path such that the first and second inner races 210A, 210B do not move or translate relative to the first and second outer races 208A, 208B, respectively. In some examples, the continuous load path may not prevent or eliminate all movement between the first and second inner races 210A, 210B and the first and second outer races 208A, 208B, but the continuous load path can prevent loading the first and/or second bearings beyond the maximum axial load rating or the maximum thrust threshold of the respective bearing. In some examples, the first and second inner races 210A, 210B and the first and second outer races 208A, 208B can form respective engagements (via the sets of balls 220A-220D and the raceways 218A-218D) that enable an allowable or permissible amount of movement of the first and second inner races 210A, 210B relative to the first and second outer races 208A, 208B, respectively.

The first set of balls 220A can engage the first raceway 218A to provide a first resistance to thrust load(s) exerted on the first bearing 206A which displace the first inner race 210A relative to the first outer race 208A. The second set of balls 220B can engage the second raceway 218B to provide a second resistance to thrust load(s) exerted on the first bearing 206A which displace the first inner race 210A relative to the first outer race 208A. The first bearing 206A can have a total resistance to thrust load(s) that is greater than the first resistance or the second resistance. In other words, the combination or summation of the first and second thrust resistances can result in a total thrust resistance of the first bearing 206A that is greater than the first thrust resistance or the second thrust resistance.

The third set of balls 220C can engage the third raceway 218C to provide a third resistance to thrust load(s) exerted on the second bearing 206B which displace the second inner race 210B relative to the second outer race 208B. The fourth set of balls 220D can engage the fourth raceway 218D to provide a fourth resistance to thrust load(s) exerted on the second bearing 206B which displace the second inner race 210B relative to the second outer race 208B. The second bearing 206B can have a total resistance to thrust load(s) that is greater than the third resistance or the fourth resistance. In other words, the combination or summation of the third and fourth thrust resistances can result in a total thrust resistance of the second bearing 206B that is greater than the individual third or fourth thrust resistances.

The first set of balls 220A can engage the first raceway 218A to provide a first radial load threshold of the first bearing 206A. The second set of balls 220B can engage the second raceway 218B to provide a second radial load threshold of the first bearing 206A. The first bearing 206A can have a total radial load threshold that is greater than the first radial load threshold or the second radial load threshold. In other words, the combination or summation of the first and second radial load thresholds can result in a total radial load threshold of the first bearing 206A that is greater than the first radial load threshold or the second radial load threshold.

The third set of balls 220C can engage the third raceway 218C to provide a third radial load threshold of the second bearing 206B. The fourth set of balls 220D can engage the fourth raceway 218D to provide a fourth radial load threshold of the second bearing 206B. The second bearing 206B can have a total radial load threshold that is greater than the third radial load threshold or the fourth radial load threshold. In other words, the combination or summation of the third and fourth radial load thresholds can result in a total radial load threshold of the second bearing 206B that is greater than the third radial load threshold or the fourth radial load threshold.

In some examples, as shown in FIG. 2D, one or more of the first or second bearings 206A, 206B can include an inner race and outer race of differing widths. For example, the outer race 208A of the first bearing 206A can be a first width $W_1$ and the inner race 210A of the first bearing 206A can be a second width $W_2$ different from the first width $W_1$. In some examples, the first width $W_1$ can be less than the second width $W_2$. In some examples, the first width $W_1$ can be greater than the second width $W_2$. In other examples, the first width $W_1$ can be equivalent to the second width $W_2$. While the widths of the outer and inner races 208A, 210A of the first bearing 206A is explicitly described herein, the respective widths of the inner and outer races of the second bearing 206B can be equally or alternatively dissimilar as described above with reference to the first bearings 206A. In some examples, a combination or summation of the respective widths of the first and second inner races 210A, 210B can be greater than or equal to the width W of the bore 212.

Figure 2E:
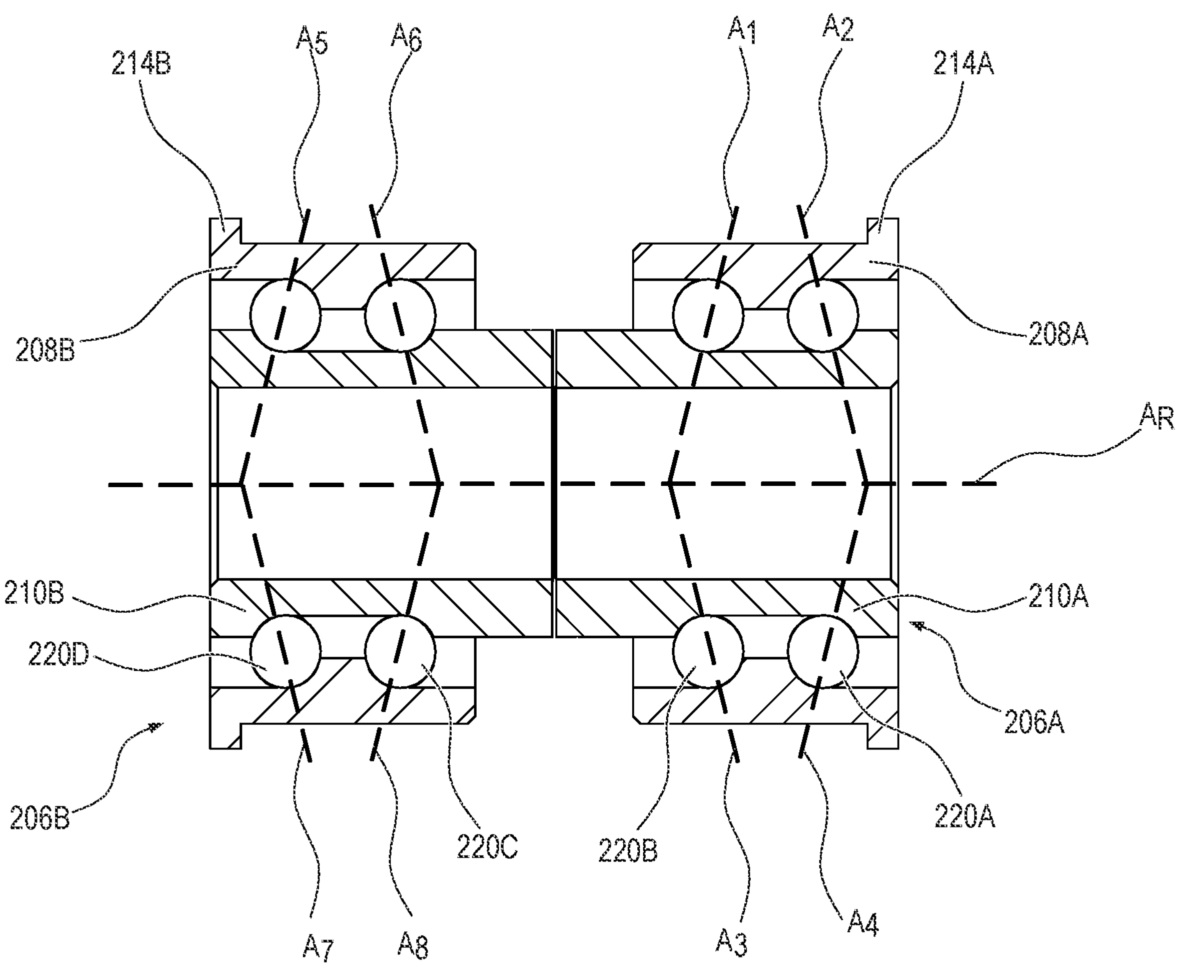
FIG. 2E is a cross-sectional rear view of a set of bearings, according to some embodiments.

FIG. 2E shows the set of bearings (e.g., the first and second bearings 206A, 206B) arranged as duplex bearings. For example, the respective inner and outer races of each bearing can be machined and/or configured to be pre-biased or pre-loaded to provide increased performance characteristics. For example, regarding the first bearing 206A, the first and second sets of balls 220A, 220B can contact the first outer and inner races 208A, 210A along axes $A_1$, $A_2$, $A_3$, $A_4$ that extend non-perpendicular to an axis of rotation AR of the first bearing 206A. In some examples, as shown in FIG. 2E, the first bearing 206A can be configured as a duplex bearing having a back-to-back or O arrangement. In some examples, the first bearing 206A can be alternatively configured such that the axes $A_1$, $A_2$, $A_3$, $A_4$ are configured non-perpendicular to the axis of rotation AR to form a face-to-face or X arrangement duplex bearing. In some examples, the first bearing 206A can be alternatively configured such that the axes $A_1$, $A_2$, $A_3$, $A_4$ are configured non-perpendicular to the axis of rotation AR to form a tandem arrangement duplex bearing.

Regarding the second bearing 206B, the third and fourth sets of balls 220C, 220D can contact the second outer and inner races 208B, 210B along axes $A_5$, $A_6$, $A_7$, As that extend non-perpendicular to the axis of rotation AR of the second bearing 206B. In some examples, as shown in FIG. 2E, the second bearing 206B can be configured as a duplex bearing having a back-to-back or O arrangement. In some examples, the second bearing 206B can be alternatively configured such that the axes $A_5$, $A_6$, $A_7$, As are configured non-perpendicular to the axis of rotation AR to form a face-to-face or X arrangement duplex bearing. While the duplex bearings of FIG. 2E are shown as back-to-back or O arrangement duplex bearings, the set of bearings can be back-to-back (i.e., O arrangement), face-to-face (i.e., X arrangement), tandem arrangement, a combination thereof, or any other combination of duplex bearings.

One advantage of including one or more duplex bearings within the set of bearings is the availability of various arrangements and configurations of bearings for optimization of the unique load cases experienced by the bearing(s) due to forces induced on the cam during use, or the forces resulting from installation and assembly of the archery components. For example, a manufacture's permitted tolerance of cam bore width, W, could allow a gap (or interference) between adjacent bearing components (e.g., between the inner race 210A and the inner race 210B) which could induce a translation or movement of the inner races 210A, 210B relative to the outer races 208A, 208B during assembly. Translation or movement of the inner race 210A relative to the outer race 208A, for example, can result in a large thrust force on bearings 206A, 206B. Among other advantages, a pair of arranged duplex bearings can provide resistance to assembly thrust force and prevent damage to bearing components, and allow the bearings to operate in an optimized manner after assembly thrust load.

Additionally, or alternatively, design optimization of duplex bearings can provide for optimization of component forces, tolerances from manufacture methods, and tolerances of installation/assembly processes to achieve optimized bearing performance and durability. The unique forces applied to cams and their bearings during all phases of installation, assembly and use can require a combination of various bearing arrangements to achieve optimized performance. For example, a specific thrust bearing could be added to the cam assembly 200 to resist damage from thrust forces during the bearing installation and assembly process, but the additional thrust resistance may not be needed after the installation and assembly process and would then reduce efficiency of the cam system as used. However, a properly arranged/configured pair of duplex bearings could provide enough thrust force resistance for installation and assembly processes while remaining optimized for primary radial forces during use.

Figure 3A:
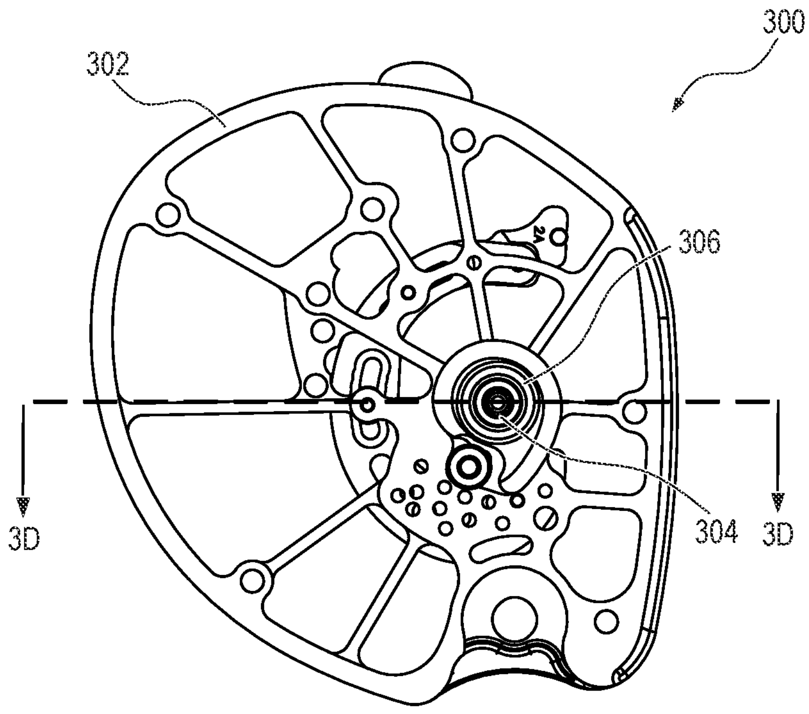
FIG. 3A is a side view of a cam assembly, according to some embodiments.
Figures 3B, 3C:
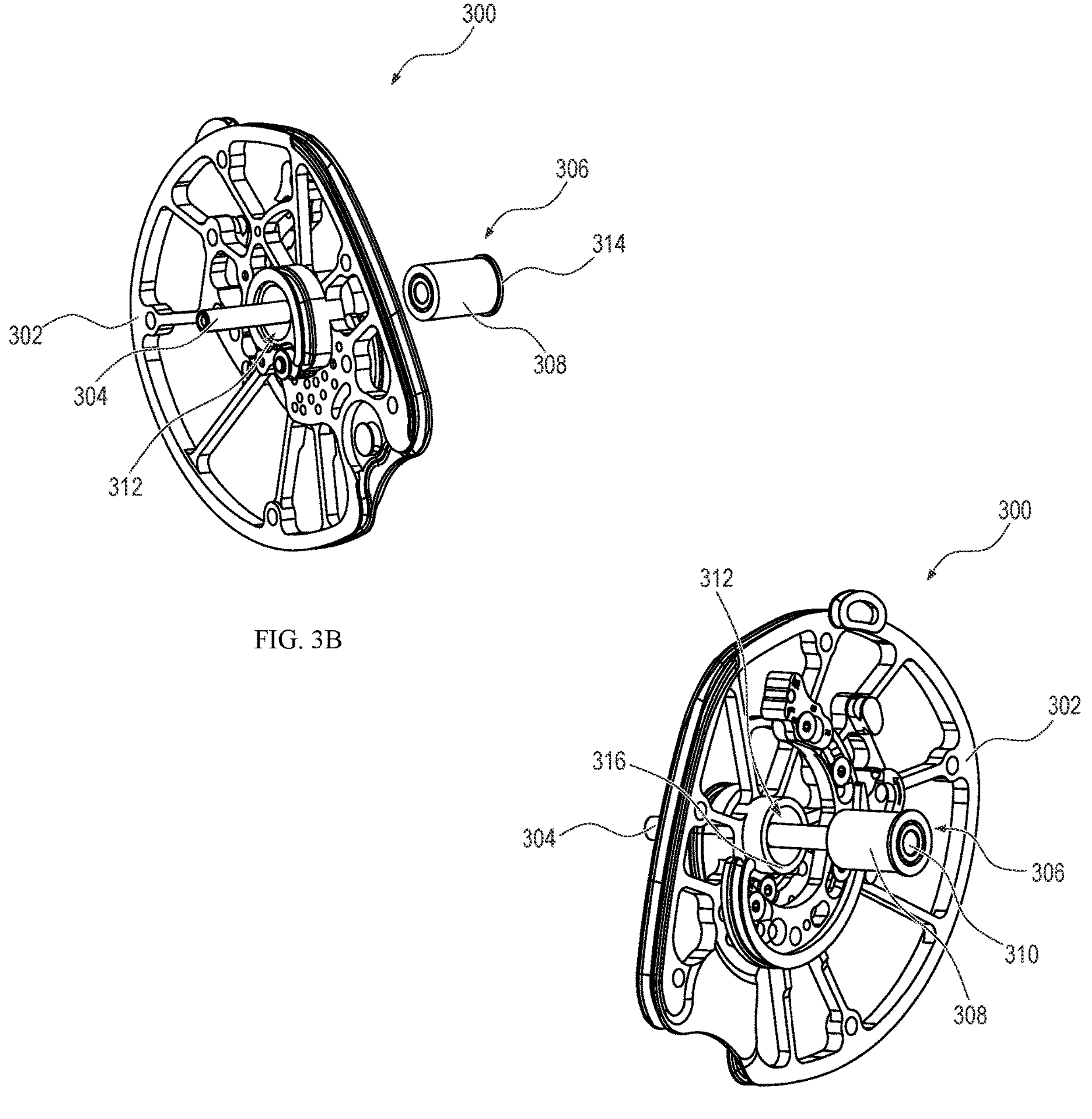
FIG. 3B is a partially exploded perspective side view of the cam assembly, according to some embodiments.
FIG. 3C is a partially exploded perspective side view of the cam assembly, according to some embodiments.

FIG. 3A shows a cam assembly 300 according to one embodiment. FIGS. 3B and 3C show partially exploded views of the cam assembly 300. The cam assembly 300 can include a cam 302, an axle 304, and a bearing 306. In some examples, the cam assembly 300 can further include one or more additional bearings, fasteners, modules, polymeric dampers, cable splitters, a combination thereof, or any other component associated with an archery bow eccentric. In some examples, the bearing 306 can be a duplex bearing (see present disclosure referring to FIG. 2E).

In some examples, the bearing 306 can include an outer race 308 and an inner race 310. The outer race 308 can be press-fit, fastened, adhered, or otherwise coupled within a bore 312 or cavity formed within the cam 302. The axle 304 can be disposed within the inner race 310 of the bearing 306. In some examples, the outer race 308 can include a flanged portion 314. The flanged portion 314 can contact a lateral surface of the cam 302 (e.g., lateral surface 316) when the bearing 306 is at least partially disposed within the bore 312. In some examples, the flanged portion 314 can be integrally formed with the outer race 308. In some examples, the flanged portion 314 can be a discrete component of the bearing 306 and can be coupled or otherwise affixed to the outer race 308. In some examples, the outer race 308 may not include a flanged portion.

Figure 3D:
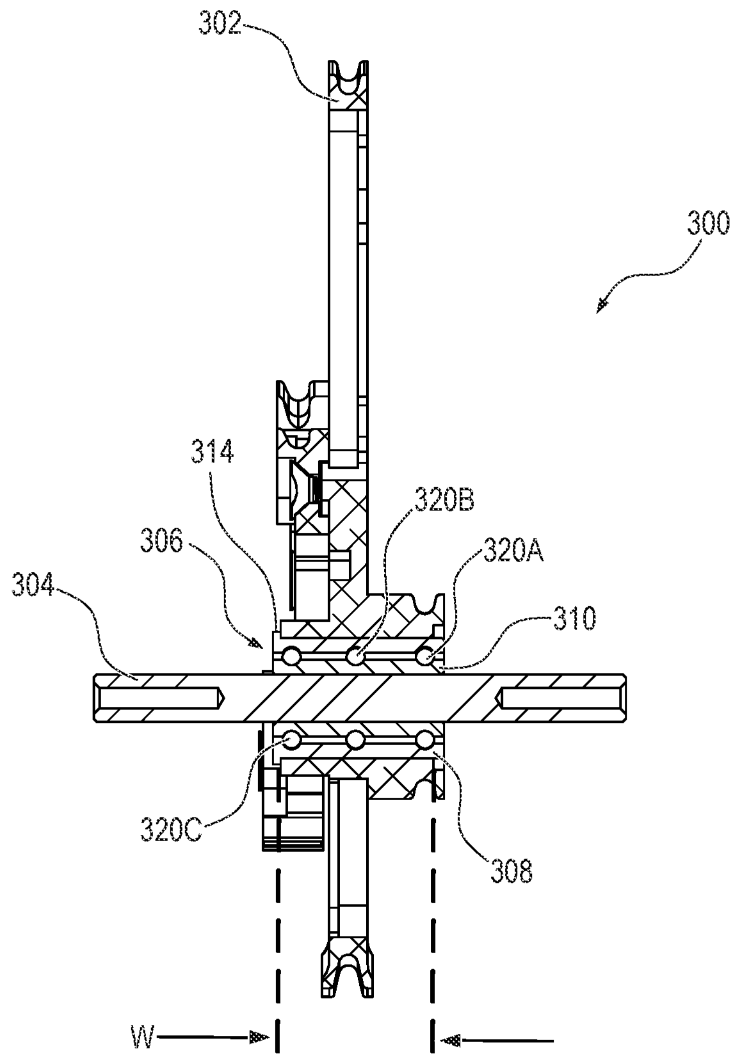
FIG. 3D is a cross-sectional rear view of the cam assembly, according to some embodiments.
Figure 3E:
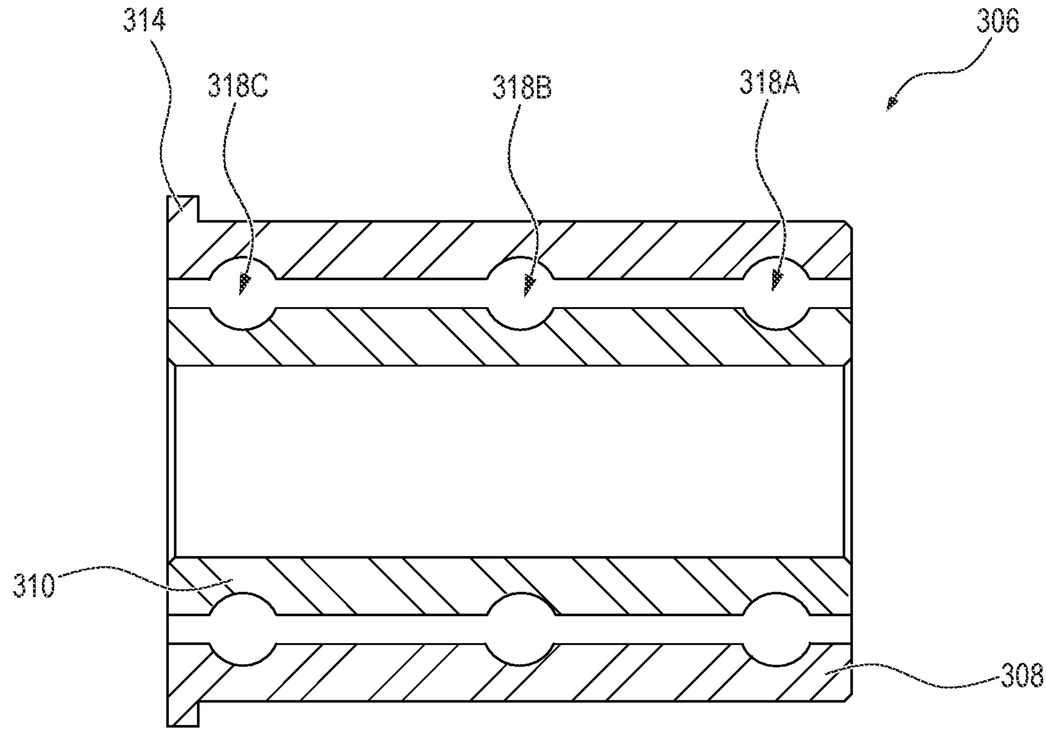
FIG. 3E is a cross-sectional rear view of a bearing, according to some embodiments.

FIG. 3D shows a cross-sectional view of the cam assembly 300 through the section line 3D-3D shown in FIG. 3A. FIG. 3E shows a cross-sectional view of the bearing 306 through the section line 3D-3D shown in FIG. 3A. In some examples, the bearing 306 can include two or more discrete sets of balls (e.g., stainless steel balls) disposed within two or more discrete raceways defined or formed by the outer race 308 and the inner race 310. For example, the outer race 308 and the inner race 310 can form or define a first raceway 318A, a second raceway 318B and a third raceway 318C (see FIG. 3E). In some examples, each of the first raceway 318A, the second raceway 318B, and the third raceway 318C can be formed or defined as channels or grooves within surfaces of the outer race 308 and inner race 310 that face one another. For example, the channels or grooves can be machined, molded, or otherwise incorporated into the outer race 308 and the inner race 310. Each of the first, second, and third raceways 318A, 318B, 318C can locate and retain first, second, and third sets of balls 320A, 320B, 320C (see FIG. 3D) within the bearing 306. The first, second, and third raceways 318A, 318B, 318C are shown in FIG. 3E with the respective sets of balls 320A, 320B, 320C removed. In some examples, the respective diameters of each of the first, second, or third sets of balls 320A, 320B, 320C can be equivalent, dissimilar, or a combination thereof.

The two or more discrete raceways (e.g., the raceways 318A-318C) and sets of balls (e.g., sets of balls 320A-320C) can increase an axial load threshold, a radial load threshold, a moment load threshold, or a combination thereof of the bearing 306 by distributing the loads applied to the bearing 306 across two or more discrete sets of balls (e.g., sets of balls 320A-320C) disposed within the respective raceways (e.g., the raceways 318A-318C).

In some examples, the bearing 306 can include more than the first, second, and third raceways 318A-318C. For example, the bearing 306 can include more than three raceways, such as, four or more raceways formed or defined by the outer race 308 and the inner race 310. Each of the four or more raceways can at least partially retain or house respective sets of balls within each raceway. In some examples, the bearing 306 can include less than the first, second, and third raceways 318A-318C. For example, the bearing 306 can include two raceways formed or defined by the outer race 308 and the inner race 310. Each of the two raceways can at least partially retain or house respective sets of balls within each raceway.

In some examples, the inner race 310 of the bearing 306 can extend an entire width W of the bore 312 of the cam 302 such that the bearing 306 envelops or encases a portion of the axle 304 disposed within the bore 312 of the cam 302. Similarly, portions of the axle 304 disposed outside of the bore 312 can be enveloped or encased by one or more limbs (e.g., the set of limbs 110A, 110B) and/or one or more cam spacers (e.g., cam spacers 120A, 120B). Enveloping or surrounding the axle 304 can create or form a continuous load path such that an axial load or a thrust load exerted on the inner race 310 does not substantially move or translate the inner race 310 relative to the outer race 308.

Additionally, or alternatively, enveloping or surrounding the axle 304 can create or form a continuous load path to substantially reduce or mitigate any moments induced on the inner race 310 by compressive loading the components of the archery bow coupled to the axle 304. In some examples, the movement between the inner race 310 relative to the outer race 308 mitigated or limited by the continuous load path can be minimized to prevent a load exceeding a maximum axial load rating or a maximum thrust threshold of the bearing. In some examples, the inner race 310 and the outer races 308 can form respective engagements (via the sets of balls 320A-320C and the raceways 318A-318C) that enable an allowable or permissible amount of movement of the inner race 310 relative to the outer race 308. While the continuous load path may not prevent or eliminate all movement between the inner race 310 and the outer race 308, the continuous load path can prevent loading the bearing 306 beyond the maximum axial load rating or the maximum thrust threshold of the bearing.

The first set of balls 320A can engage the first raceway 318A to provide a first resistance to thrust load(s) exerted on the bearing 306 which displace the inner race 310 relative to the outer race 308. The second set of balls 320B can engage the second raceway 318B to provide a second resistance to thrust load(s) exerted on the bearing 306 which displace the inner race 310 relative to the outer race 308. The third set of balls 320C can engage the third raceway 318C to provide a third resistance to thrust load(s) exerted on the bearing 306 which displace the inner race 310 relative to the outer race 308. The bearing 306 can have a total resistance to thrust load(s) that is greater than the first resistance, the second resistance, or the third resistance. In other words, the combination or summation of the first, second, and third thrust resistances can result in a total thrust resistance greater than the first, second, or third thrust resistances taken individually.

The first set of balls 320A can engage the first raceway 318A to provide a first radial load threshold of the bearing 306. The second set of balls 320B can engage the second raceway 318B to provide a second radial load threshold of the bearing 306. The third set of balls 320C can engage the third raceway 318C to provide a third radial load threshold of the bearing 306. The bearing 306 can have a total radial load threshold that is greater than the first radial load threshold, the second radial load threshold, or the third radial load threshold. In other words, the combination or summation of the first, second, and third radial load thresholds can result in a total radial load threshold of the bearing 306 that is greater than the first radial load threshold, the second radial load threshold, or the third radial load threshold.

In some examples, the tolerances of one or more components of the archery bow (e.g., cam 302, bearing 306, set of limbs 110A, 110B, one or more cam spacers 120A, 120B, the inner race 310, or a combination thereof) can cause a very small minority of the axle 304 to be exposed (e.g., unenveloped or not surrounded by a combination of the inner race 310, cam spacer(s), limbs, etc.) while the archery bow is at rest, drawn, and/or launching a projectile. For example, a minute portion of the axle 304 between the inner race 310 and a cam spacer 120A, 120B or a limb 110A, 110B can be exposed or unenveloped while the archery bow is at rest, drawn, or launching a projectile. This minute exposed or unenveloped portion of the axle 304, however, is a substantial minority of the portion of the axle 304 enveloped or surrounded by the combination of the inner race 310, cam spacer(s), limbs, etc. such that 5% or less of a length of the axle 304 enveloped or surrounded by the combination of the inner race 310, cam spacer(s), limbs, etc.

Figure 4A:
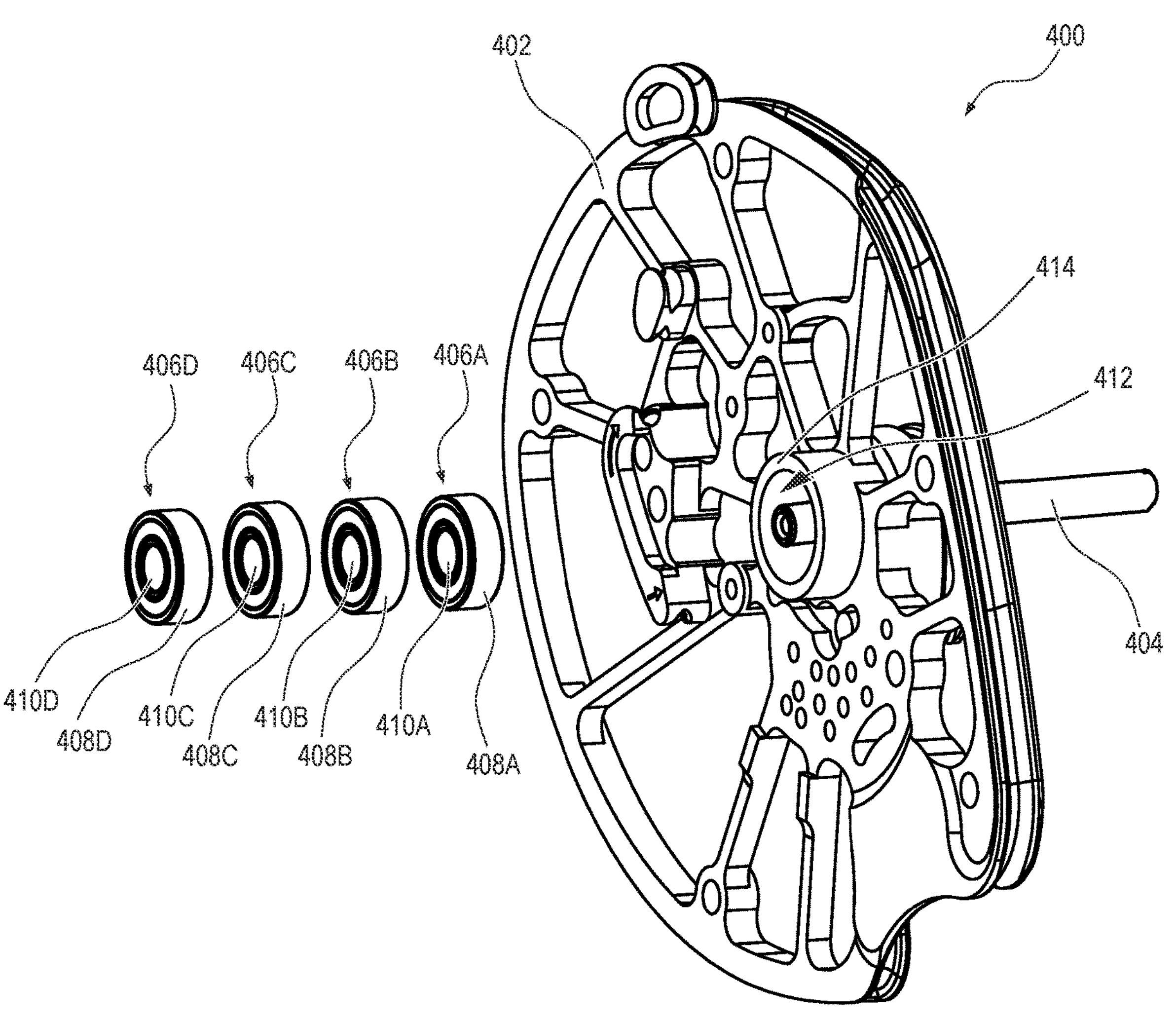
FIG. 4A is a partially exploded perspective side view of a cam assembly, according to some embodiments.

FIG. 4A shows a partially exploded view of a cam assembly 400. The cam assembly 400 can include a cam 402, an axle 404, a first bearing 406A, a second bearing 406B, a third bearing 406C, and a fourth bearing 406D. In some examples, the cam assembly 400 can further include one or more additional bearings, fasteners, modules, polymeric dampers, cable splitters, a combination thereof, or any other component associated with an archery bow eccentric.

In some examples, the first bearing 406A can include a first outer race 408A and a first inner race 410A. The first outer race 408A can be press-fit, fastened, adhered, or otherwise coupled within a bore 412 or cavity formed within the cam 402. The second bearing 406B can include a second outer race 408B and a second inner race 410B. The second outer race 408B can be press-fit, fastened, adhered, or otherwise coupled within the bore 412 formed within the cam 402. Similarly, the third and fourth bearings 406C, 406D can include respective third and fourth outer races 408C, 408D and respective third and fourth inner races 410C, 410D. The third and/or fourth outer races 408C, 408D can be press-fit, fastened, adhered, or otherwise coupled within the bore 412 formed within the cam 402. The axle 404 can be disposed within the first, second, third, and fourth inner races 410A-410D of the first, second, third, and fourth bearings 406A-406D, respectively.

Figure 4B:
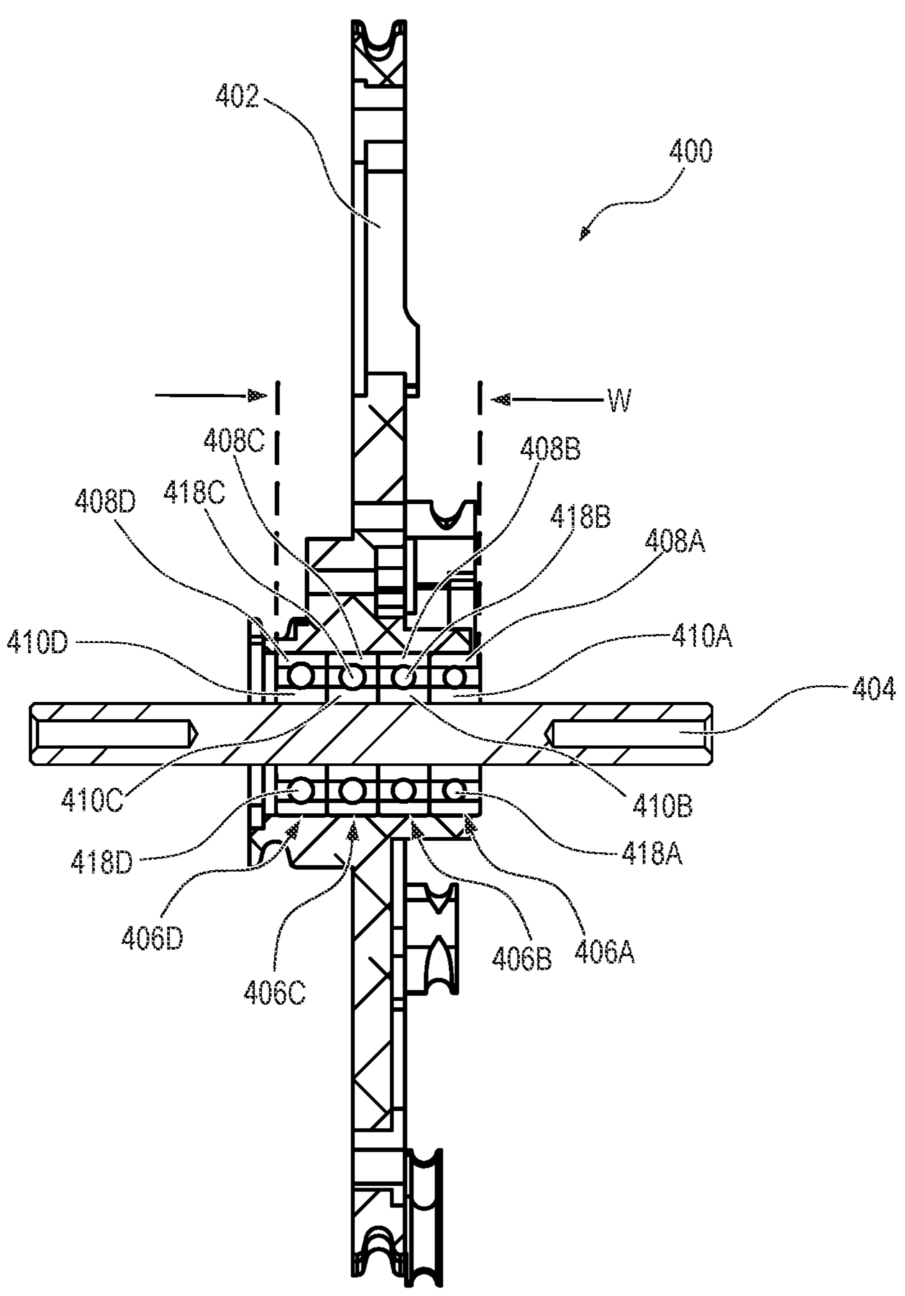
FIG. 4B is cross-sectional rear view of the cam assembly, according to some embodiments.
Figure 4C:
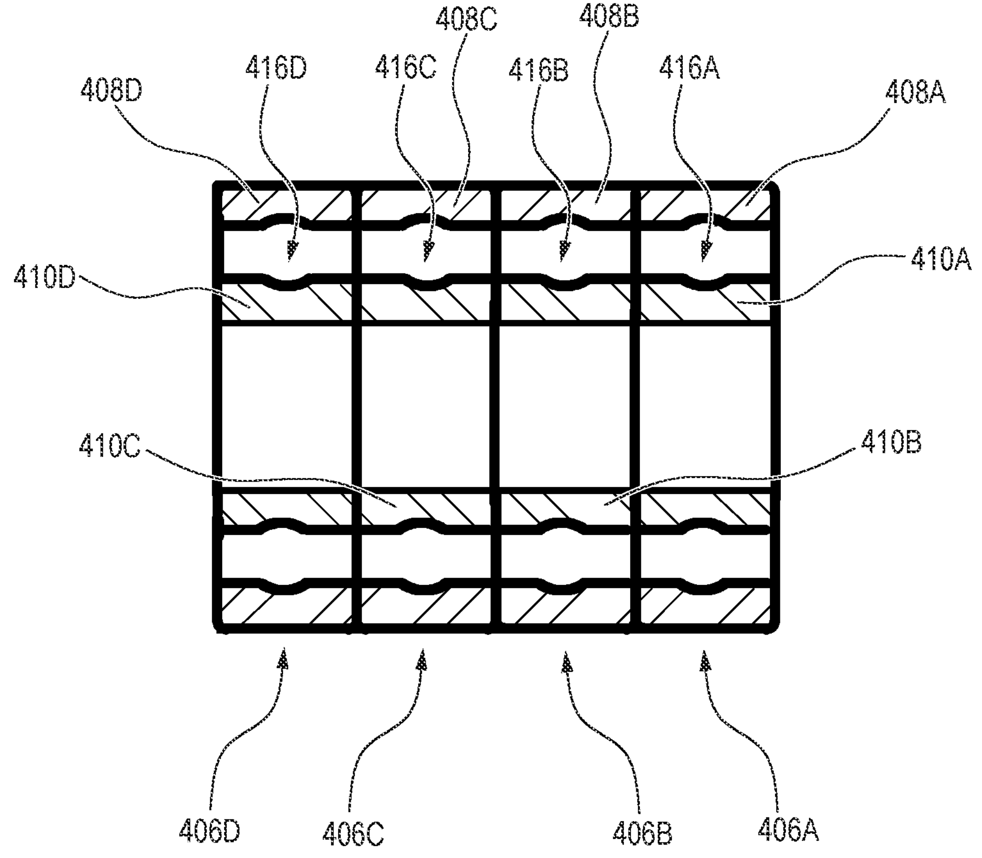
FIG. 4C is a cross-sectional rear view of a set of bearings, according to some embodiments.

While not shown in FIGS. 4A-4C, in some examples, one or more of the bearings 406A-406D can include respective flanged portions (see e.g., first and second flanged portions 214A, 214B). For example, one or both of the first outer race 408A and the fourth outer race 408D can include a flanged portion contacting a lateral surface (e.g., lateral surface 414) of the cam 402 when the first and fourth bearings 406A, 406D are at least partially disposed within the bore 412.

FIG. 4B shows a cross-sectional view of the cam assembly 400. FIG. 4C shows a cross-sectional view of the set of bearings (i.e., the respective bearings 406A-406D). In some examples, one or more of the first, second, third, and fourth bearings 406A-406D can include discrete sets of balls (e.g., stainless steel balls) disposed within respective raceways defined or formed by the respective outer races 408A-408D and the respective inner races 410A-410D. For example, the first outer race 408A and the first inner race 410A can form or define a first raceway 416A and the second outer race 408B and the second inner race 410B can form or define a second raceway 416B. The third outer race 408C and the third inner race 410C can form or define a third raceway 416C and the fourth outer race 408D and the fourth inner race 410D can form or define a fourth raceway 416D. In some examples, one or more of the set of bearings (e.g., the bearings 406A-406D) can be duplex bearings (see present disclosure referring to FIG. 2E).

In some examples, each of the respective raceways 416A-416D can be formed or defined as channels or grooves within surfaces of the respective outer races 408A-408D and respective inner races 410A-410D that face one another. For example, the channels or grooves can be machined, molded, or otherwise incorporated into the respective outer races 408A-408D and the respective inner races 410A-410D. Each of the respective raceways 416A-416D can locate and retain respective sets of balls 418A-418D within the respective bearings 406A-406D. The first, second, third, and fourth raceways 416A-416D are shown in FIG. 4C with the respective sets of balls 418A-418D removed.

In some examples, each of the respective inner races 410A-410D can abut or contact another respective inner race 410A-410D such that the bearings 406A-406D envelop or encase the portion of the axle 404 disposed within the bore 412 of the cam 402. In other words, the bearings 406A-406D effectively surround or bound a portion of the axle 404 extending a width W of the bore 412 of the cam 402. Abutting the respective inner races 410A-410D to one another can create or form a continuous load path such that an axial load or a thrust load exerted on the respective inner races 410A-410D does not substantially move or translate the respective inner races 410A-410D relative to the respective outer races 408A-408D.

Additionally, or alternatively, abutting the respective inner races 410A-410D can create or form a continuous load path to substantially reduce or mitigate any moments induced on the respective inner races 410A-410D. In some examples, the movement between the respective inner races 410A-410D relative to the respective outer races 408A-408D mitigated or limited by the continuous load path can be insufficient to apply a load placing the bearings 406A-406D beyond a maximum axial load rating or a maximum thrust threshold of the respective bearing. While the continuous load path may not prevent or eliminate all movement between the respective inner races 410A-410D and the respective outer races 408A-408D, the continuous load path can prevent loading the bearings 406A-406D beyond the maximum axial load rating or the maximum thrust threshold of the respective bearing.

Figure 5A:
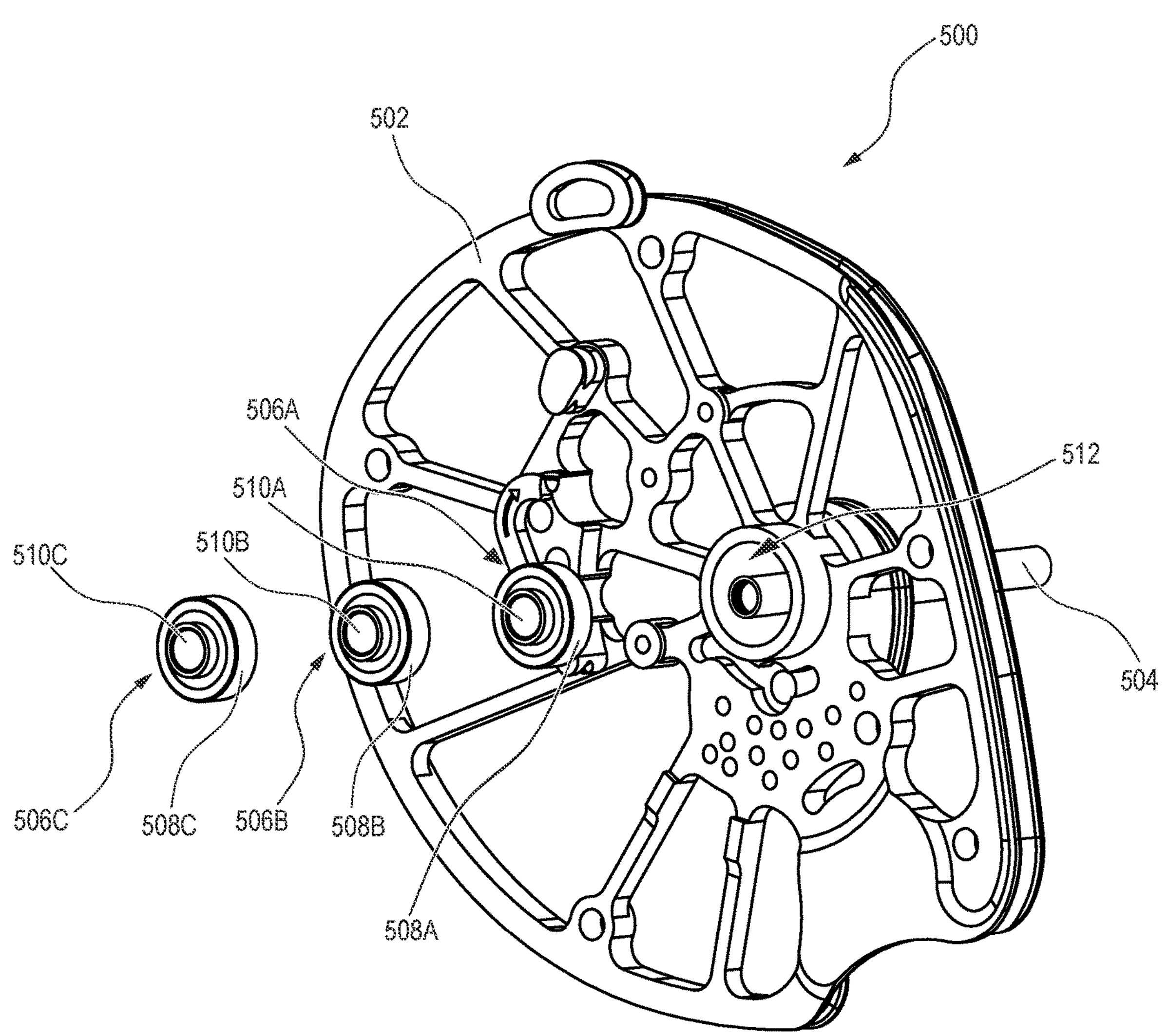
FIG. 5A is a partially exploded perspective side view of a cam assembly, according to some embodiments.

FIG. 5A shows a partially exploded view of a cam assembly 500. The cam assembly 500 can include a cam 502, an axle 504, a first bearing 506A, a second bearing 506B, and a third bearing 506C. In some examples, the cam assembly 500 can further include one or more additional bearings, fasteners, modules, polymeric dampers, cable splitters, a combination thereof, or any other component associated with an archery bow eccentric.

In some examples, the first bearing 506A can include a first outer race 508A and a first inner race 510A. The first outer race 508A can be press-fit, fastened, adhered, or otherwise coupled within a bore 512 or cavity formed within the cam 502. The second bearing 506B can include a second outer race 508B and a second inner race 510B. The second outer race 508B can be press-fit, fastened, adhered, or otherwise coupled within the bore 512 formed within the cam 502. Similarly, the third bearing 506C can include a third outer race 508C and a third inner race 510C. The third outer race 508C can be press-fit, fastened, adhered, or otherwise coupled within the bore 512 formed within the cam 502. The axle 504 can be disposed within the first, second, and third inner races 510A-410C of the first, second, and third bearings 506A-506C, respectively.

Figure 5B:
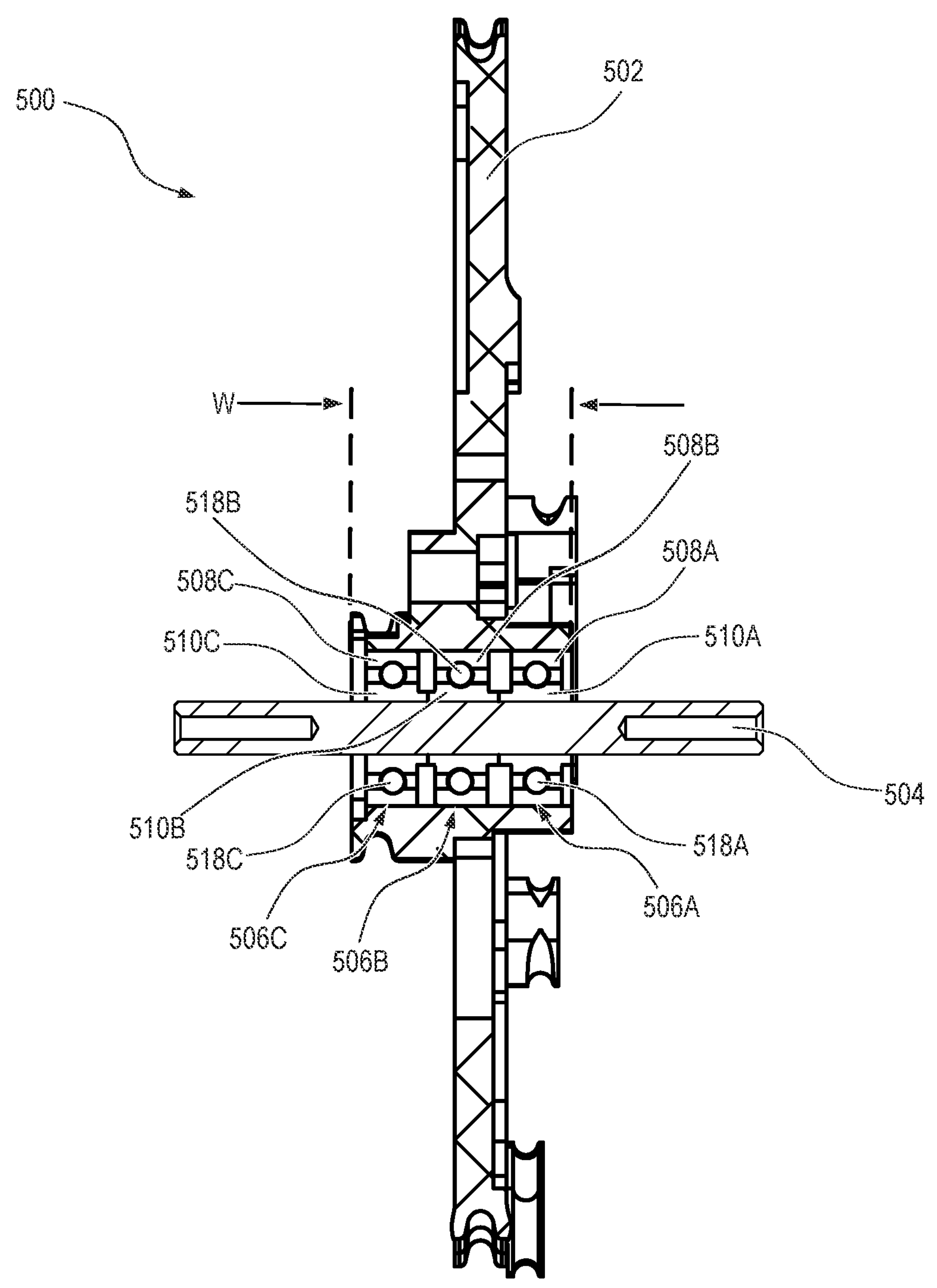
FIG. 5B is cross-sectional rear view of the cam assembly, according to some embodiments.
Figure 5C:
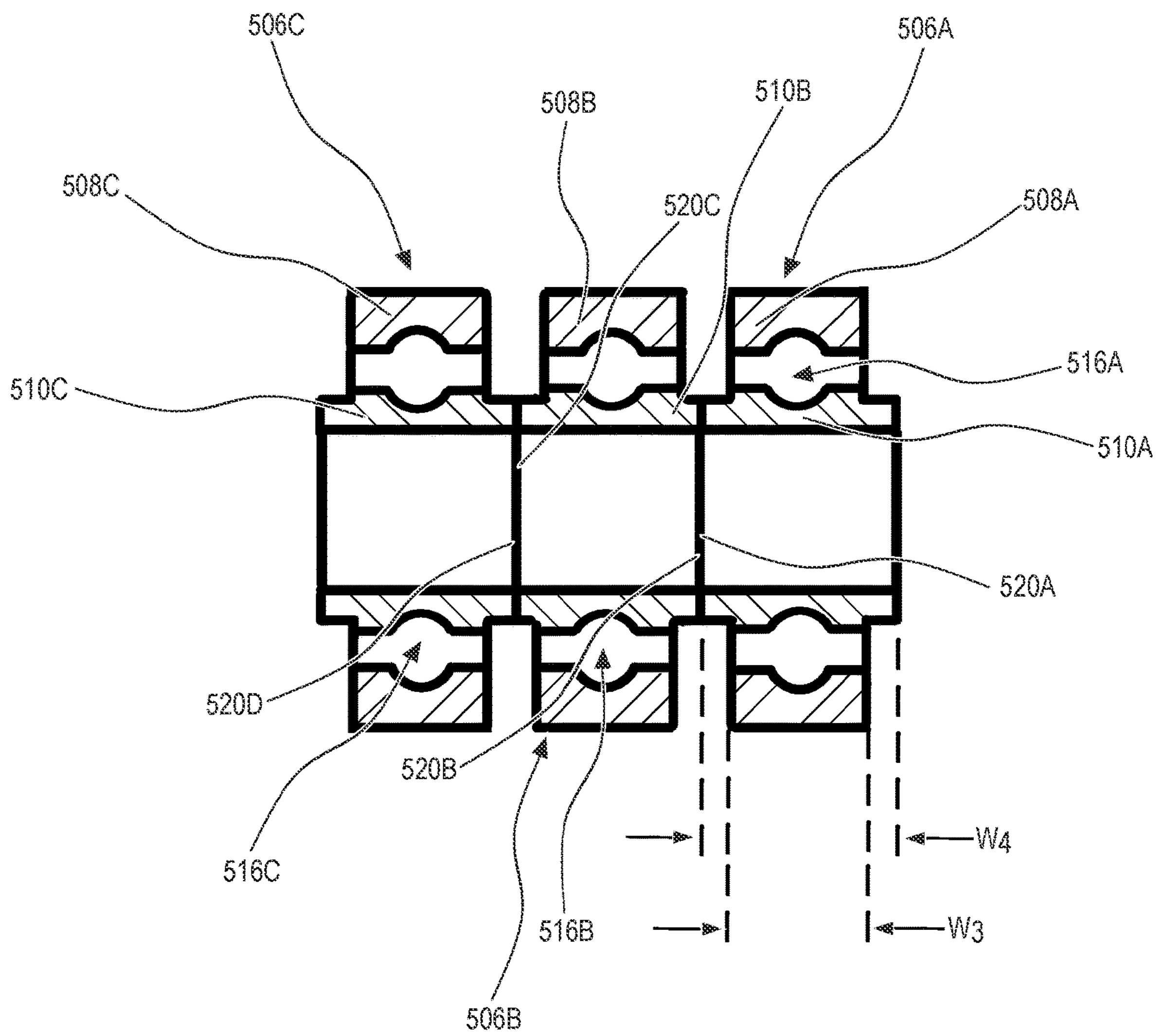
FIG. 5C is a cross-sectional rear view of a set of bearings, according to some embodiments.

FIG. 5B shows a cross-sectional view of the cam assembly 500. FIG. 5C shows a cross-sectional view of the set of bearings (i.e., the respective bearings 506A-506C). In some examples, one or more of the first, second, and third bearings 506A-506C can include discrete sets of balls (e.g., stainless steel balls) disposed within respective raceways defined or formed by the respective outer races 508A-508C and the respective inner races 510A-510C. For example, the first outer race 508A and the first inner race 510A can form or define a first raceway 516A and the second outer race 508B and the second inner race 510B can form or define a second raceway 516B. Similarly, the third outer race 508C and the third inner race 510B can form or define a third raceway 516C. In some examples, one or more of the set of bearings (e.g., the bearings 506A-506C) can be duplex bearings (see present disclosure referring to FIG. 2E).

In some examples, each of the respective raceways 516A-516C can be formed or defined as channels or grooves within surfaces of the respective outer races 508A-508C and respective inner races 510A-510C that face one another. For example, the channels or grooves can be machined, molded, or otherwise incorporated into the respective outer races 508A-508C and the respective inner races 510A-510C. Each of the respective raceways 516A-516C can locate and retain respective sets of balls 518A-518C within the respective bearings 506A-506C. The first, second, and third raceways 516A-516C are shown in FIG. 5C with the respective sets of balls 518A-518C removed.

In some examples, the first inner race 510A can include a first rim 520A abutting or contacting a second rim 520B of the second inner race 510B. Similarly, the second inner race 510B can include a third rim 520C abutting or contacting a fourth rim 520D of the third inner race 510C such that the first, second, and third inner races 510A-510C envelop or encase the portion of the axle 504 disposed within the bore 512 of the cam 502. In other words, the first, second, and third bearings 506A-506C surround or bound a portion of the axle 504 extending a width W of the bore 512 of the cam 502. Abutting the respective inner races 510A-510C can create or form a continuous load path such that an axial load or a thrust load exerted on the first, second, and third inner races 510A-510C does not substantially move or translate the first, second, and third inner races 510A/510C relative to the first, second, and third outer races 508A-508C, respectively.

Additionally, or alternatively, abutting the first rim 520A to the second rim 520B and the third rim 520C to the fourth rim 520D can create or form a continuous load path to substantially reduce or mitigate any moments induced on the first, second, and third inner races 510A-510C. In some examples, the movement between the inner races 510A-510C relative to the respective outer races 508A-508B mitigated or limited by the continuous load path can be insufficient to apply a load placing the first, second, and/or third bearings 506A-506C beyond a maximum axial load rating or a maximum thrust threshold of the respective bearing. While the continuous load path may not prevent or eliminate all movement between the first, second, and third inner races 510A-510C and the respective outer races 508A-508C, the continuous load path can prevent loading the first, second, and/or third bearings 506A-506C beyond the maximum axial load rating or the maximum thrust threshold of the respective bearing.

In some examples, the tolerances of one or more components within the cam assembly 500 (e.g., cam 502, first bearing 506A, second bearing 506B, third bearing 506C, etc.) can cause a very small minority of the axle 504 located within the bore 512 to be exposed (e.g., unenveloped or not surrounded by the first, second, third inner races 510A-510C) while the archery bow is at rest, drawn, or launching a projectile. For example, the first rim 520A and the second rim 520B can be out of contact or come out of contact with one another while the archery bow is at rest, drawn, or launching a projectile and thereby create a minute minority of the axle 504 that is not surrounded by the first and second inner races 510A, 510B. Similarly, the third rim 520C and the fourth rim 520D can be out of contact or come out of contact with one another while the archery bow is at rest, drawn, or launching a projectile and thereby create a minute minority of the axle 504 that is not surrounded by the second and third inner races 510B, 510C. This minute exposed or unenveloped portion of the axle 504, however, is a substantial minority of the portion of the axle 504 enveloped or surrounded by the first, second, and third inner races 510A-510C such as 5% or less of a length of the portion of the axle 504 enveloped or surrounded by the first, second, and third inner races 510A-510C.

In some examples, the cam assembly 500 and one or more other components of the archery bow can generate or form a continuous load path. For example, the limbs (e.g., set of limbs 110A, 110B), the cam spacers (e.g., the one or more cam spacers 120A, 120B), the first, second, and third inner races 510A-510C can be placed in compression on the axle 504 by one or more fasteners (e.g., the one or more fasteners 118A, 118B) to create or form a continuous load path such that the first, second, and third inner races 510A-510C do not move or translate relative to the first, second, and third outer races 508A-508C, respectively. In some examples, the continuous load path may not prevent or eliminate all movement between the first, second, and third inner races 510A-510C and the first, second, and third outer races 508A-508C, but the continuous load path can prevent loading the first and/or second bearings beyond the maximum axial load rating or the maximum thrust threshold of the respective bearing. In some examples, the first, second, and third inner races 510A-510C and the first, second, and third outer races 508A-508C can form respective engagements (via the sets of balls 518A-518C and the raceways 516A-516C) that enable an allowable or permissible amount of movement of the first, second, and third inner races 510A-510C relative to the first, second, and third outer races 508A-508C, respectively.

In some examples, as shown in FIG. 5C, one or more of the first, second, and/or third bearings 506A-506C can include an inner race and outer race of differing widths. For example, the outer race 508A of the first bearing 506A can be a first width $W_3$ and the inner race 510A of the first bearing 506A can be a second width $W_4$ different from the first width $W_3$. In some examples, the first width $W_3$ can be less than the second width $W_4$. In some examples, the first width $W_3$ can be greater than the second width $W_4$. In other examples, the first width $W_3$ can be equivalent to the second width $W_4$. While the widths of the outer and inner races 508A, 510A of the first bearing 506A is explicitly described herein, the respective widths of the inner and outer races of the second and third bearings 506B, 506C can be equally or alternatively dissimilar as described above with reference to the first bearings 506A. In some examples, a combination or summation of the respective widths of the first, second, and third inner races 510A-510C can be greater than or equal to the width W of the bore 512.

In some examples, changes may be made in the function and arrangement of archery components or products discussed without departing from the spirit and scope of the disclosure, and various embodiments may omit, substitute, or add other components or accessories as appropriate. For instance, one or more portions incorporated into a particular component described with respect to certain embodiments may be combined in other embodiments.

Various aspects have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed:

1. A cam assembly for an archery bow, comprising:
a cam defining a bore spanning a width of the cam;
an axle; and
a bearing rotatable about the axle, the bearing comprising:
an inner race spanning an entirety of the width, the inner race defining a continuous load path across the width;
an outer race defining a first raceway and a second raceway discrete from the first raceway;
a first set of balls disposed within the first raceway and between the inner race and the outer race; and
a second set of balls disposed within the second raceway and between the inner race and the outer race.

2. The cam assembly of claim 1, wherein:
the outer race has a first width;
the inner race has a second width; and
the second width is greater than the first width.

3. The cam assembly of claim 1, wherein:
the first set of balls engage the first raceway to provide a first thrust resistance;
the second set of balls engage the second raceway to provide a second thrust resistance; and
the bearing has a total thrust resistance greater than the first thrust resistance or the second thrust resistance.

4. The cam assembly of claim 1, wherein:
the first set of balls engage the first raceway to provide a first radial load threshold;
the second set of balls engage the second raceway to provide a second radial load threshold; and
the bearing has a total radial load threshold greater than the first radial load threshold or the second radial load threshold.

5. The cam assembly of claim 1, further comprising:
a first spacer disposed on the axle and adjacent the inner race;
a second spacer disposed on the axle and adjacent the inner race, wherein the first spacer, the second spacer, and the inner race form the continuous load path.

6. A cam assembly for an archery bow, comprising:
a cam defining a bore spanning a width of the cam;
an axle at least partially disposed within the bore; and
a set of bearings at least partially disposed within the bore and rotatable about the axle, the set of bearings comprising:
a first bearing including a first raceway and a first set of balls disposed within the first raceway, the first bearing including a first inner race at least partially defining the first raceway;
a second bearing including a second raceway and a second set of balls disposed within the second raceway, the second bearing including a second inner race at least partially defining the second raceway; and
a third bearing including a third raceway and a third set of balls disposed within the third raceway, the third bearing including a third inner race at least partially defining the third raceway,
wherein;
the first inner race contacts the second inner race and the second inner race contacts the third inner race; and
the first inner race, the second inner race, and the third inner race span an entirety of the width to form a continuous load path.

7. The cam assembly of claim 6, further comprising:
a first spacer disposed on the axle and adjacent the first inner race;
a second spacer disposed on the axle and adjacent the third inner race, wherein the first spacer, the second spacer, the first inner race, the second inner race, and the third inner race form the continuous load path.

8. The cam assembly of claim 6, wherein:
the first bearing includes a first outer race;
the first outer race has a first width;
the first inner race has a second width greater than the first width.

9. The cam assembly of claim 8, wherein:
the second bearing includes a second outer race;
the second outer race has a third width;
the second inner race has a fourth width greater than the third width.

10. The cam assembly of claim 6, wherein the set of bearings further comprises a fourth bearing including a fourth raceway and a fourth set of balls disposed within the fourth raceway, the fourth bearing including a fourth inner race at least partially defining the fourth raceway,
wherein:
the third inner race contacts the fourth inner race, and
the first inner race, the second inner race, the third inner race, and the fourth inner race span an entirety of the width to form the continuous load path.

11. A bearing for an archery bow, comprising:
an inner race defining a first raceway and a second raceway discrete from the first raceway;
an outer race rotatable about an axis of rotation;
a first set of balls disposed within the first raceway and between the inner race and the outer race, the first set of balls arranged on a first axis extending non-perpendicular to the axis of rotation; and
a second set of balls disposed within the second raceway and between the inner race and the outer race, the second set of balls arranged on a second axis extending non-perpendicular to the axis of rotation wherein the bearing is configured to be disposed within a bore of a cam or a roller wheel of an archery bow, and the inner race spanning an entirety of a width of the bore to define a continuous load path across the width.

12. The bearing of claim 11, wherein:
the outer race has a first width; and
the inner race has a second width greater than the first width.

13. The bearing of claim 11, wherein the first set of balls and the second set of balls are arranged in an O arrangement.

14. The bearing of claim 11, wherein the first set of balls and the second set of balls are arranged in an X arrangement.

15. The bearing of claim 11, wherein the first set of balls and the second set of balls are arranged in a tandem arrangement.

* * * * *